United States Patent
Liu

(10) Patent No.: US 8,301,415 B2
(45) Date of Patent: Oct. 30, 2012

(54) SYSTEM AND METHOD FOR TESTING GRAPHICS CARD

(75) Inventor: Qing-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 424 days.

(21) Appl. No.: 12/695,682

(22) Filed: Jan. 28, 2010

(65) Prior Publication Data

US 2011/0098978 A1 Apr. 28, 2011

(30) Foreign Application Priority Data

Oct. 28, 2009 (CN) .......................... 2009 1 0308963

(51) Int. Cl.
*G06F 11/30* (2006.01)
(52) U.S. Cl. ....................................................... 702/186
(58) Field of Classification Search ................... 702/186
See application file for complete search history.

(56) References Cited

U.S. PATENT DOCUMENTS

| 7,027,972 B1 * | 4/2006 | Lee ................................. 703/22 |
| 2009/0144007 A1 * | 6/2009 | Moreira et al. ................. 702/81 |

FOREIGN PATENT DOCUMENTS

JP 2009-087327 * 4/2009

* cited by examiner

*Primary Examiner* — Cindy H Khuu
(74) *Attorney, Agent, or Firm* — Altis Law Group, Inc.

(57) ABSTRACT

A system is used to test a 3D image processing capability of a video card. The system includes a 3D model engine module, a 3D model module, a test parameter module, and a check module. The 3D model module is capable of building a 3D model engine. The test parameter module is capable of setting test parameters. The check module is capable of checking a test result. The 3D model is processed by the video card within the test parameters and a running environment which is set by the 3D model engine under the test parameters, and the check module checks if the video card processes the 3D model properly.

10 Claims, 3 Drawing Sheets refresh rate [ ]    display resolution rate [ ]

mode of processing 3D model [ ]

shading mode [ ]

test duration time [ ]

FIG. 2

SYSTEM AND METHOD FOR TESTING GRAPHICS CARD

BACKGROUND

1. Technical Field

The present disclosure relates to systems and methods for testing add-on cards of computers, and more particularly to a graphics card test system and method.

2. Description of Related Art

At present, real-time three-dimensional (3D) graphics are common in computer games, which lead to an increasing demand for 3D graphics cards. During manufacture, the graphics cards need to be tested for checking their operability. One important step of testing the graphics cards is to test a 3D image processing capability of the graphics cards. The graphics cards process the 3D image according to perspective collineation and matrix calculation to show the 3D image on a screen. However, the conventional testing method for the 3D image processing capability is often complex.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 2 is a sketch view of a test parameter input interface.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
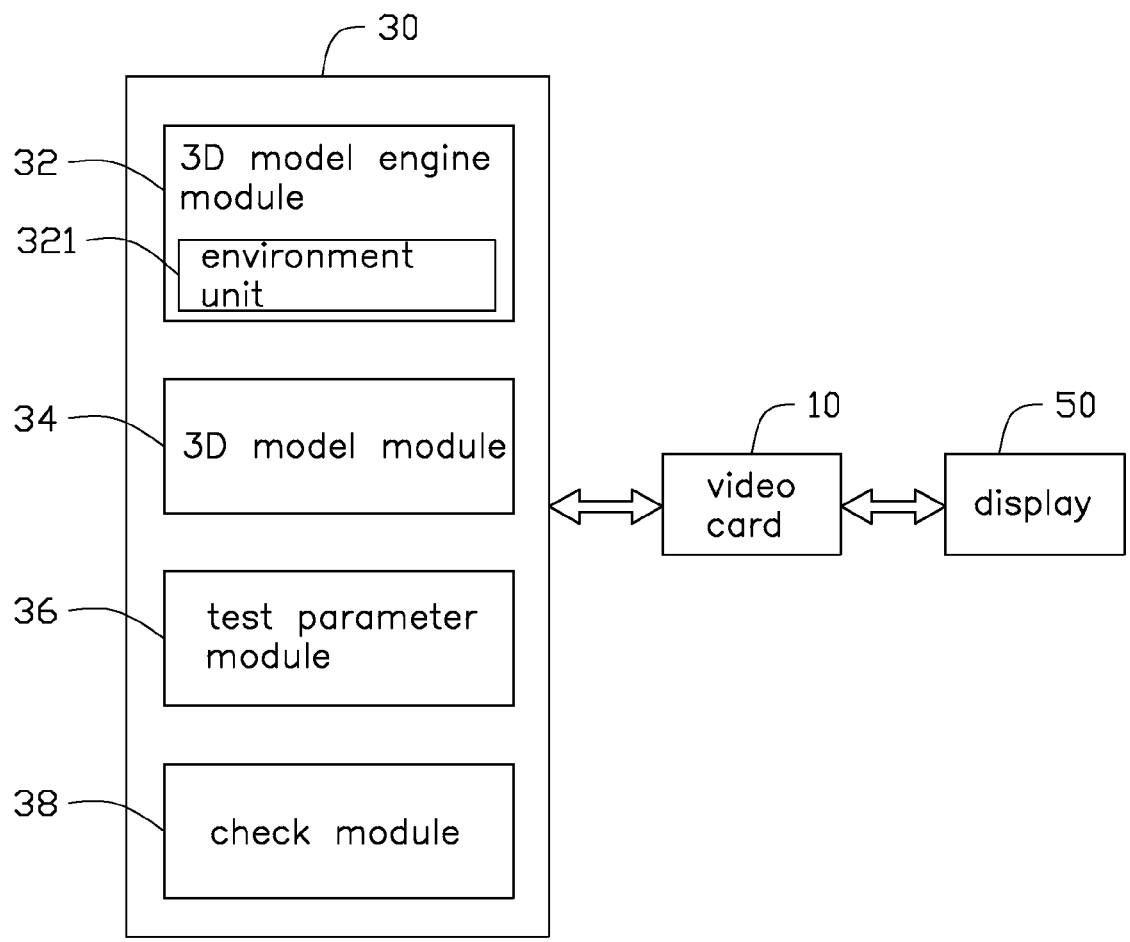
FIG. 1 is a block view of a system for testing the 3D image processing capability of a video card.

Referring to FIG. 1, a system for testing a 3D image processing capability of a video card 10 includes a test apparatus 30. The test apparatus 30 includes a 3D model engine module 32, a 3D model module 34, a test parameter module 36, and a check module 38. The test apparatus 30 is connected to the video card 10 which is further connected to the display 50.

The 3D model engine module 32 is used to build a 3D model engine. The 3D model engine module 32 includes an environment unit 321 for setting a running environment of a 3D model, such as building a 3D coordinate system, a viewpoint, and a light source.

The 3D model module 34 is used to build a 3D model. The 3D model module 34 sets shapes, dimensions, materials, positions, and so on, of the 3D model.

Referring to FIGS. 1 and 2, the test parameter module 36 is used to set test parameters, which includes a refresh rate, a display resolution rate, a mode of processing the 3D model, a shading mode, test duration time, and so on. The video card 10 is tested under the condition of that the display 50 shows the 3D model under the refresh rate and the display resolution rate. The mode of processing the 3D mode sets a manner of the video card 10 processing the 3D model. There are different modes that can be chosen to process the 3D model, such as rotating a 3D image of the 3D model in the display 50, the 3D image fading in or out, and so on. The test parameter module 36 presets a plurality of shading modes that can be chosen to shading the 3D image when testing the video card 10. The plurality of shading modes includes flat shading, Gouraud shading, phone shading, scan line renderer, ray-traced, and so on.

The check module 38 is used to test the capability of the video card to process the 3D model. If it is capable, the video card 10 passes the test, and if it is incapable, the video card 10 fails the test.

Figure 3:
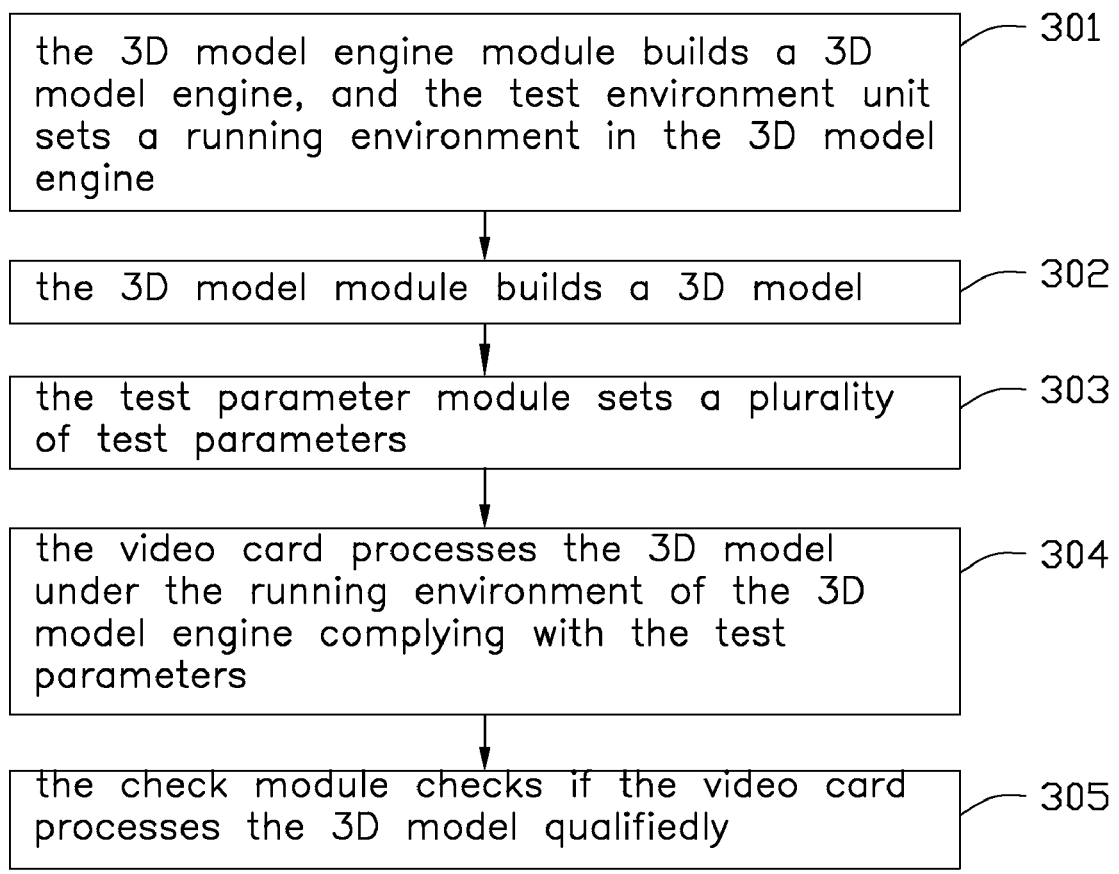
FIG. 3 is a flow view of a method for testing a 3D image processing capability of a video card.

Referring to FIG. 3, a method for testing the 3D image processing capability of the video card 10 includes following steps.

In step 301, the 3D model engine module 32 builds a 3D model engine, and the test environment unit 321 sets a running environment in the 3D model engine.

In step 302, the 3D model module 34 builds a 3D model.

In step 303, the test parameter module 36 sets a plurality of test parameters.

In step 304, the 3D model engine is started. The video card 10 processes the 3D model under the running environment of the 3D model engine complying with the test parameters. A 3D image corresponding to the 3D model is shown on the display 50.

In step 305, the check module 38 checks if the video card 10 processes the 3D model properly. If it is proper, the video card 10 passes the test, and if it is improper, the video card 10 fails the test.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A system for testing a 3D image processing capability of a video card, comprising:
   a 3D model engine module capable of building a 3D model engine;
   a 3D model module capable of creating a 3D model;
   a test parameter module capable of setting test parameters;
   a check module capable of checking a test result;

wherein when the 3D model is processed by the video card within the test parameters and a running environment which is set by the 3D model engine, the check module is capable of checking if the video card processes the 3D model properly; the 3D model engine module comprises an environment unit for setting a running environment of the 3D model; and the running environment of the 3D model comprises at least one of a coordinate system, a viewpoint, and a light source.

2. The system of claim 1, further comprising a display connected to the video card, and the display capable of showing a 3D image corresponding to the video card processing the 3D model.

3. The system of claim 2, wherein the test parameters comprises at least one of the refresh rate of the display, resolution rate of the display, mode of processing the 3D model, shading mode, and test duration time.

4. The system of claim 3, wherein the mode of processing the 3D model can be chosen from rotating the 3D image, the 3D image fading in, or the 3D image fading out.

5. The system of claim 3, wherein the shading mode can be chosen form flat shading, Gouraud shading, phone shading, scan line renderer, or ray-traced.

6. A method for testing a 3D image processing capability of a video card, comprising following steps:

building a 3D model engine by a 3D model engine module;

creating a 3D model by a 3D model module;

setting a plurality of test parameters by a test parameter module; and processing the 3D model by the video card within the test parameters and a running environment which is set by the 3D model engine;

wherein the running environment comprises at least one of the a coordinate system, a viewpoint, and a light source.

7. The method of claim 6, further comprising a step of determining if the video card processes the 3D model properly; if it is proper, the video card passes the test, and if it is improper, the video card fails the test.

8. The method of claim 7, wherein the plurality of test parameters comprises at least one of the refresh rate of a display connected to the video card, resolution rate of the display, mode of processing the 3D model, shading mode, and test duration time.

9. The method of claim 8, wherein the mode of processing the 3D model can be chosen from rotating the 3D image, the 3D image fading in, or the 3D image fading out.

10. The method of claim 8, wherein the shading mode can be chosen form flat shading, Gouraud shading, phone shading, scan line renderer, or ray-traced.

* * * * *